United States Patent
Burgman et al.

(10) Patent No.: US 8,366,557 B2
(45) Date of Patent: Feb. 5, 2013

(54) ENGINE DRIVE PLATE CONNECTION

(75) Inventors: Boris Burgman, Oak Park, MI (US); John A. Diemer, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 273 days.

(21) Appl. No.: 12/751,758

(22) Filed: Mar. 31, 2010

(65) Prior Publication Data

US 2011/0244970 A1    Oct. 6, 2011

(51) Int. Cl.
*F16D 3/06*    (2006.01)
(52) U.S. Cl. .......................................................... 464/99
(58) Field of Classification Search ................ 464/98, 464/99; 403/335, 337
See application file for complete search history.

(56) References Cited

U.S. PATENT DOCUMENTS

| | | | |
|---|---|---|---|
| 5,616,002 A * | 4/1997 | Gartner | |
| 6,277,027 B1 * | 8/2001 | Schoder et al. | 464/98 |
| 6,561,330 B2 * | 5/2003 | Maienschein et al. | 464/98 X |
| 6,692,362 B2 * | 2/2004 | Drees et al. | 464/98 |
| 2007/0157611 A1 * | 7/2007 | Maienschein et al. | |
| 2008/0096674 A1 * | 4/2008 | Pueschel et al. | 464/98 |

* cited by examiner

*Primary Examiner* — Gregory Binda
*Assistant Examiner* — Matthieu Setliff

(57) ABSTRACT

Two embodiments of an improved connection between an engine output shaft and a transmission input shaft reduce or eliminate axial shaft loading and spin losses. In a first embodiment, the transmission input shaft includes an annular flange which is received within a slightly larger annulus or a plurality of axially extending tabs from the engine flex plate. After the transmission and engine are assembled, a plurality of fasteners are installed in radial openings in the flex plate annulus or tabs and extend into threaded openings in the annular flange. Since the output and input shafts are connected after the engine and transmission are assembled there is essentially no deflection of the flex plate, no axial loads on the shafts and no spin losses. In a second embodiment, a plurality of axially oriented threaded fasteners extend through openings in the flex plate and are received within nuts in a transmission drive plate. The nuts include eccentric flanges and are retained in the drive plate by snap rings. This eccentricity creates a reaction torque when the threaded fasteners are tightened. Because the nuts are free to travel and accommodate a small axial distance, deflection of the flex plate does not occur.

5 Claims, 3 Drawing Sheets

ENGINE DRIVE PLATE CONNECTION

FIELD

The present disclosure relates to motor vehicle drive line components and more particularly to a drive plate connection for disposition between an output of an engine and an input of a transmission.

BACKGROUND

The statements in this section merely provide background information related to the present disclosure and may or may not constitute prior art.

A critical connection or coupling in a motor vehicle powertrain resides between the engine output and the transmission input. Specifically, the engine output shaft must be securely but removably attached to the input shaft of the transmission. While a seemingly simple and uncomplicated connection, the details of such connection are complicated by the fact that the transmission, specifically the end bell of the transmission, is secured to the rear of the engine and positively establishes the locations of the two components relative to one another as well as the axial positions and spacing between the output shaft of the engine and the input shaft of the transmission.

Thus, in practice, the axial positions and spacing between the output and input shafts is determined by the configuration of and assembly of the transmission end bell to the engine. Component and assembly variations between the flex plate attached to the engine output shaft and the rigid input block or plate of the transmission may amount to several millimeters. Typical spring rates of the flex plate may be significant and on the order of 1600 Newtons per millimeter. Thus, although the flex plate is designed and intended to accommodate the variation in shaft end location from unit to unit, when assembled, the flex plate may undergo significant deflection. Therefore, when connected, the engine—transmission connection may place the engine output shaft and the transmission input shaft under significant tension and generate significant axial load on these components. This, in turn, will result in spin losses in both the engine and the transmission.

The present invention is directed to providing an improved connection between the engine output shaft and the transmission input shaft which accommodates differences in axial shaft spacing and reduces or eliminates flex plate deflection, axial loading of the shafts and attendant spin losses.

SUMMARY

The present invention provides two embodiments of an improved connection between an engine output shaft and a transmission input shaft in a motor vehicle powertrain. In a first embodiment, the transmission input shaft includes an annular flange which is received within a slightly larger annulus or a plurality of axially extending tabs from the engine flex plate. After the transmission and engine are assembled, a plurality of fasteners are installed in radial openings in the flex plate annulus or tabs and extend into threaded openings in the annular flange. Since the output and input shafts are connected after the engine and transmission are assembled there is essentially no deflection of the flex plate, no axial loads on the shafts and no spin losses.

In a second embodiment, a plurality of axially oriented threaded fasteners extend through openings in the flex plate and are received within nuts in a transmission drive plate. The nuts define eccentric flanges and are retained in the drive plate by snap rings. This eccentricity creates a reaction torque when the threaded fasteners are tightened. Because the nuts are free to travel and accommodate a small axial distance, deflection of the flex plate does not occur.

Thus it is an aspect of the present invention to provide an improved connection between an output shaft of an engine and an input shaft of a transmission.

It is a further aspect of the present invention to provide an improved connection between an output shaft of an engine and an input shaft of a transmission which reduces or eliminates flex plate deflection.

It is a still further aspect of the present invention to provide an improved connection between an output shaft of an engine and an input shaft of a transmission which reduces or eliminates axial loading of the shafts.

It is a still further aspect of the present invention to provide an improved connection between an output shaft of an engine and an input shaft of a transmission which reduces or eliminates spin losses associated with flex plate deflection and axial shaft loading.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 1A:
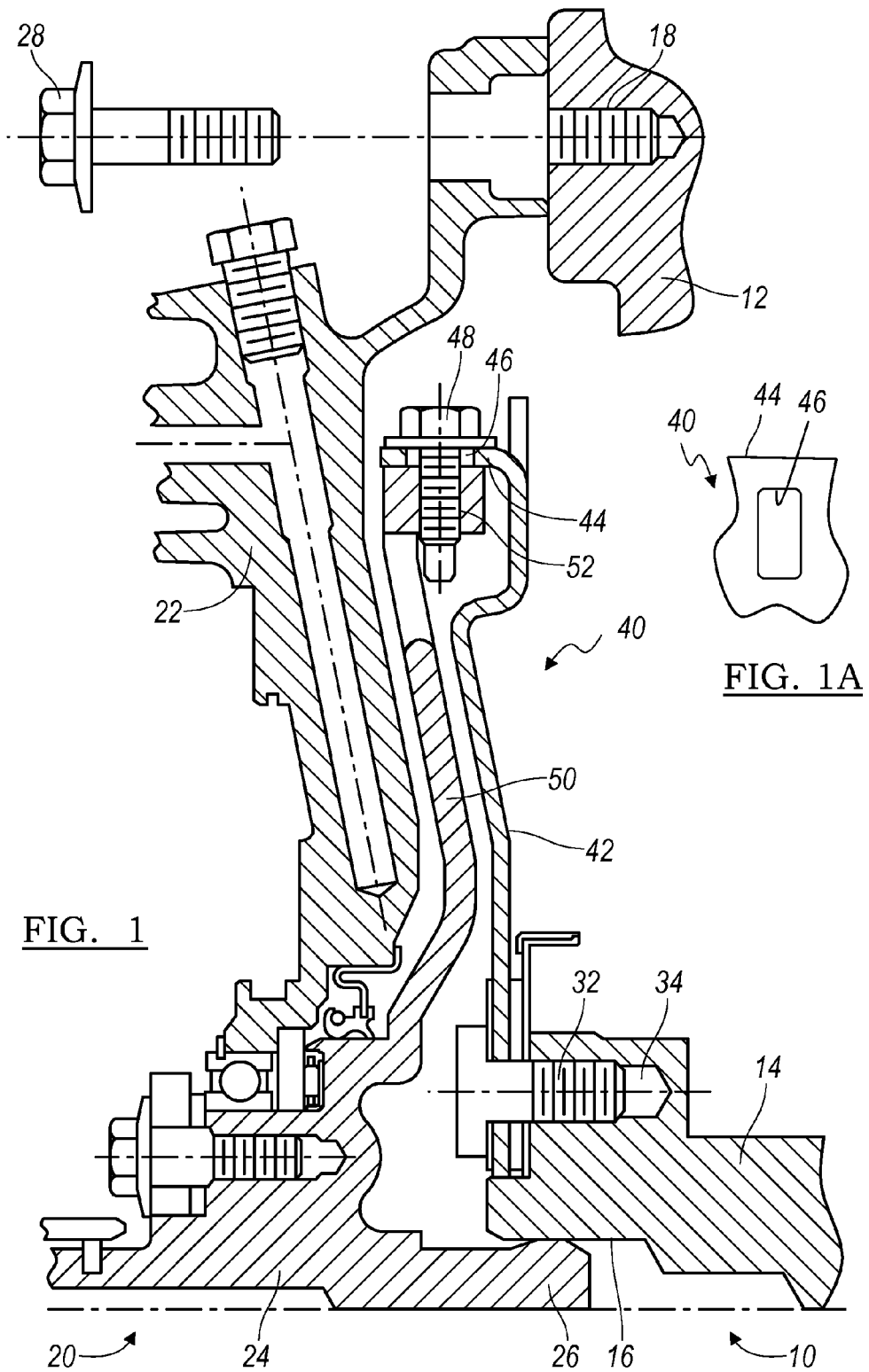
FIG. 1 is a fragmentary, sectional view of portions of an engine and a transmission which presents a first embodiment of an engine shaft to transmission shaft connection according to the present invention.
FIG. 1A is a side view of a portion of a flex plate according to an embodiment of an engine shaft to transmission shaft connection according to the present invention.

With reference to FIG. 1, a first embodiment of the engine transmission connection according to the present invention and portions of a prime mover and a transmission are illustrated and generally designated by the reference numbers 10 and 20, respectively. The prime mover 10 which may be an internal combustion gasoline, flex fuel or Diesel engine or hybrid power plant includes a an engine block or housing 12 having bearings (not illustrated) which rotatably support an output shaft 14 having a counterbore 16. Correspondingly, the transmission 20, which may be either automatic, manual or dual clutch type, includes a housing 22 which rotatably supports an input shaft 24. The input shaft 24 may include an extension 26 which is received and piloted within the counterbore 16. The housing 22 of the transmission 20 is preferably secured to the engine block or housing 12 of the prime mover 10 by a plurality of threaded fasteners 28 which are received within complementarily threaded bores 18 in the engine block or housing 12.

Secured to the output shaft 14 by a plurality of threaded fasteners 32 such as machine bolts which are received within a like plurality of threaded axial bores 34 in the output shaft 14 is a circular drive or flex plate 40. The flex plate 40 may be flat or it may define an oblique surface 42 as illustrated. The periphery of the flex plate 40 may define either an annulus or a plurality of axially extending tabs or ears 44. Either the annulus or the plurality of tabs 44 define and include a plurality of radially oriented openings or bores 46. Each of the bores or openings 46 receives a radially disposed threaded fastener 48 such as a machine bolt. In a typical assembly, there may be six, eight, ten, twelve or more ears 44, bores 46 and fasteners 48, depending primarily upon the torque transmitted across the engine transmission connection.

The diameter of the bores or openings 46 are preferably somewhat larger, e.g., on the order of 3 to 5 millimeters, than the outside diameter of the threaded fasteners 48 such that axial adjustment between the position of the threaded fasteners 48 and the annulus or tabs 44 may be made. Alternatively, the openings or bores 46 may be oval or oblong, i.e., have an axial length greater than their circumferential width. In this case the openings or bores 46 provide nominal and accepted circumferential clearance, i.e., width, relative to the outside diameter of the threaded fasteners 48 while providing axial length at least 2 to 5 millimeters greater than such outside diameter.

The plurality of threaded fasteners 48 are received with a transmission drive plate or disc 50 having a plurality of threaded radial bores 52 which align with the bores or openings 46 in the annulus or plurality of tabs 44 of the circular drive or flex plate 40.

It will thus be appreciated that connecting the transmission 20 to the engine block or housing 10 with the threaded fasteners 28 determines the relative axial locations of the output shaft 14 and the input shaft 24 and the respectively associated drive or flex plate 40 and the transmission drive plate 50. As noted above, these axial locations may diverge from an optimum, adjacent location by two millimeters or more. When connected, significant flexing of the flex plate 40 and axial tension on the shafts 14 and 24 can result if this variation or tolerance is not accommodated. Utilizing the above-described connection accommodates such shaft separation, eliminates such axial loading of the shafts 14 and 24 and reduces spin losses.

Figure 2:
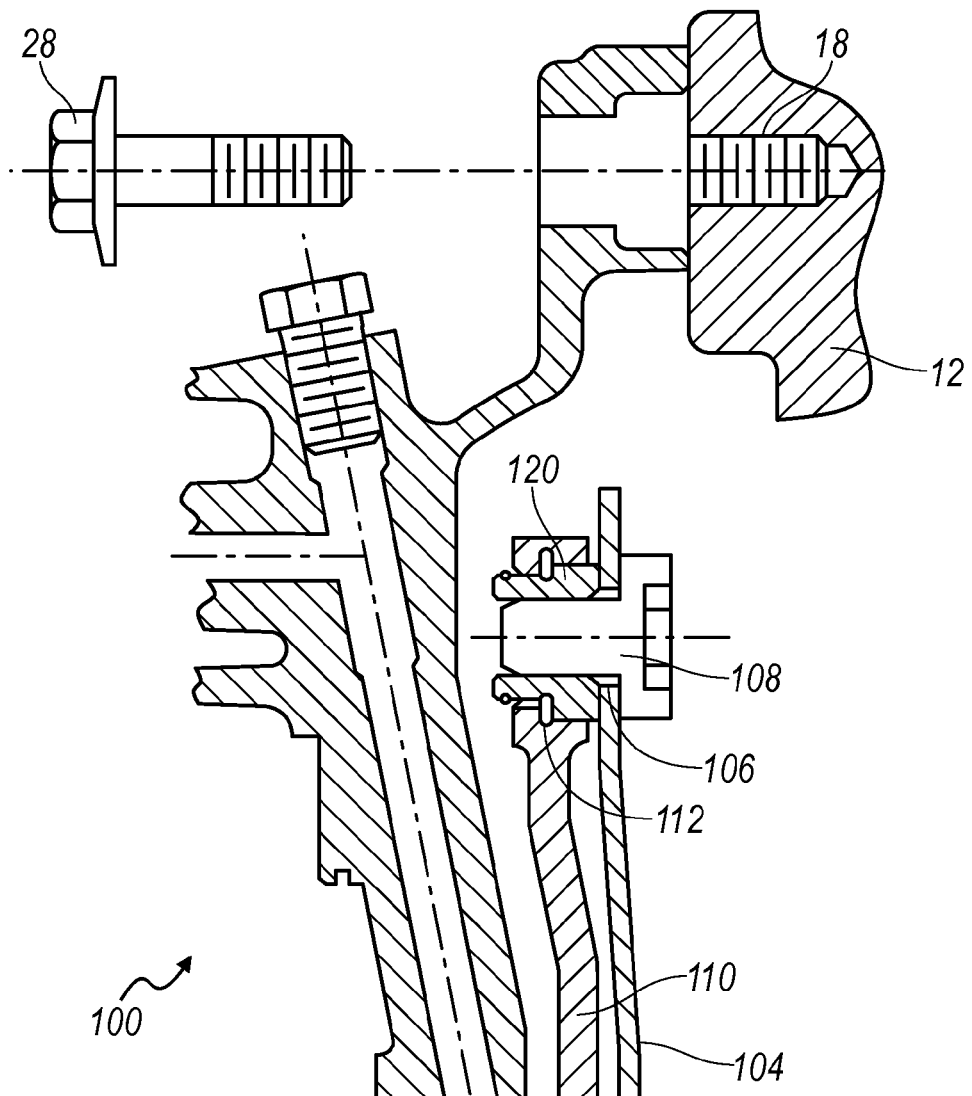
FIG. 2 is a fragmentary, sectional view of portions of engine and a transmission which presents a second embodiment of an engine shaft to transmission shaft connection according to the present invention.
Figure 3:
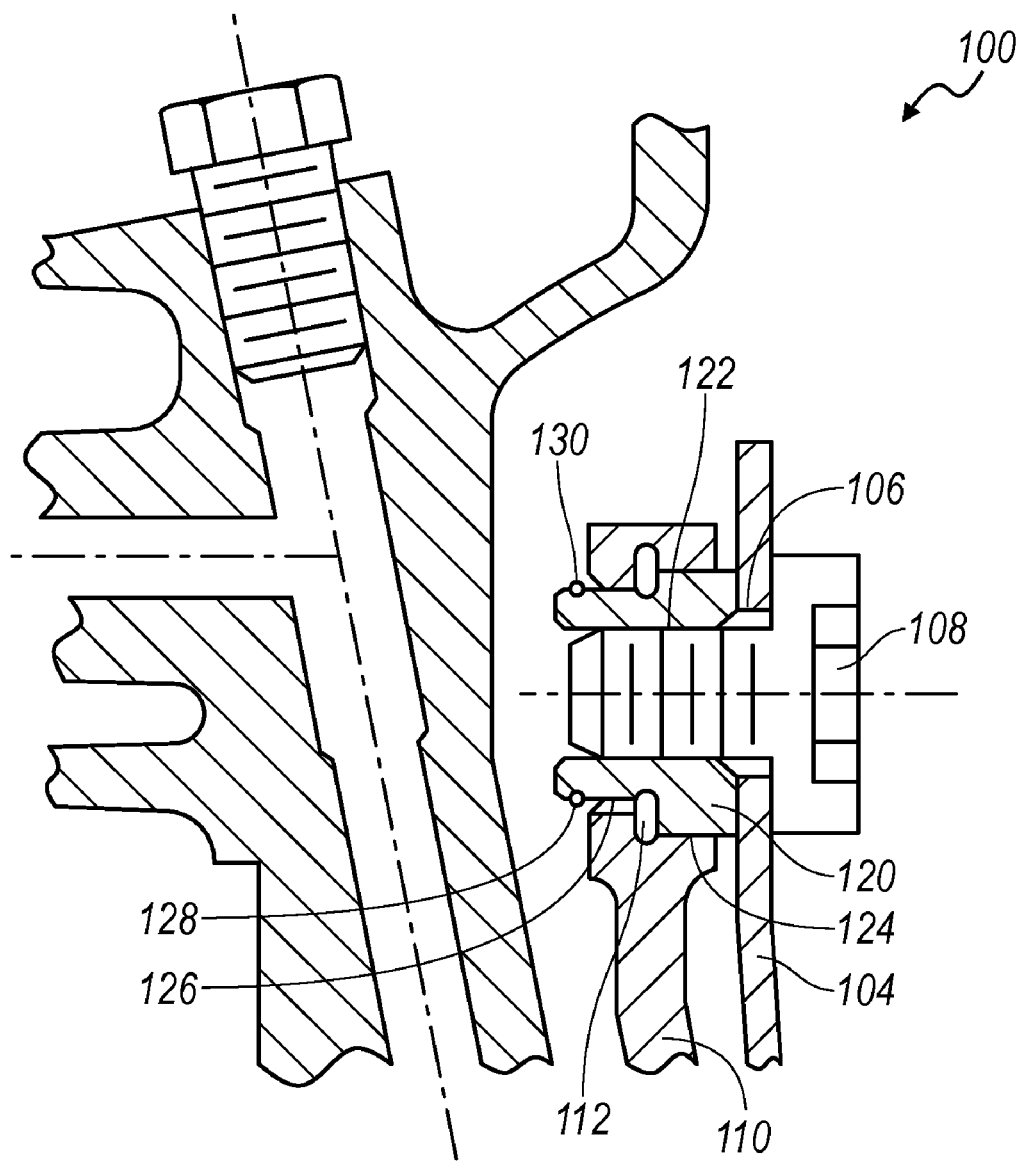
FIG. 3 is an enlarged, fragmentary, sectional view of a second embodiment of an engine shaft to transmission shaft connection according to the present invention.

Referring now to FIGS. 2 and 3, a second embodiment of an engine shaft to transmission shaft connection according to the present invention is illustrated and generally designated by the reference number 100. The engine shaft to transmission shaft connection 100 resides in the same location and thus illustrated is the engine block or housing 12, the output shaft 14, the counterbore 16, the transmission 20, the transmission housing 22, the transmission input shaft 24, the extension 26, one of the threaded fasteners 28 and one of the threaded bores 18.

A circular drive or flex plate 104 is secured to the output shaft 14 by the threaded fasteners 32 which are received within the threaded axial bores 34 in the output shaft 14. The circular drive or flex plate 104 is substantially flat and includes a plurality of axial bores 106 which receive a like plurality of axially oriented threaded fasteners 108 such as machine bolts. The bores 106 are preferably slightly larger than the diameter of the threaded fasteners 108 and loosely receive them. The transmission input shaft 24 likewise includes a transmission drive plate or disc 110 having a plurality of axial openings or bores 112.

The plurality of threaded fasteners 108 are each received within a respective plurality of nuts 120 having internal threaded passageways 122 complementary to the threaded fasteners 108 and eccentric external flanges 124. That is, the external flanges 124 are circular and have a center axis offset from the axes of the threaded passageways 122 and an adjacent portion 126 of the nuts 120 having a circumferential groove or channel 128. The nuts 120 are received within the axial bores 112 of the transmission drive plate or disc 110 and retained therein by a respective snap ring or C—washer 130 which seats in the groove or channel 128.

With the second embodiment engine—transmission connection 100, once again, after the engine block or housing 12 is secured to the transmission housing 22 with the threaded fasteners 28, the axial positions of the shafts 14 and 24 are determined. The axial bores 106 and the threaded passageways 122 are then aligned and the threaded fasteners 108 are installed. As the threaded fasteners 108 are tightened, a reaction torque is created that rotates the nuts 120 slightly until they lock within the axial bores 112 of the transmission drive plate or disc 110. Since the threaded fasteners 108 are loosely received within the axial bores 106 in the flex plate 104 and the nuts 120 may slide axially within the axial bores 112 of the transmission drive plate or disc 110 until they are tightened, both axial and radial tolerances can be accommodated by the second embodiment engine shaft—transmission shaft connection 100.

The description of the invention is merely exemplary in nature and variations that do not depart from the gist of the invention are intended to be within the scope of the invention. Such variations are not to be regarded as a departure from the spirit and scope of the invention.

What is claimed is:

1. An engine transmission shaft connection comprising, in combination,
    an engine output shaft,
    a transmission input shaft aligned with said output shaft,
    an engine flex plate secured to said output shaft, said flex plate defining a first plurality of axial bores,
    a transmission drive plate associated with said input shaft, said drive plate having a second plurality of axial bores receiving a plurality of nuts each having an eccentric external flange, wherein said nuts include a circumferential groove and a snap ring disposed in said groove to retain said nuts in said second plurality of axial bores, and
    a plurality of threaded fasteners extending through said bores of said flex plate and into said nuts.

2. The engine transmission shaft connection of claim 1 whereby tightening said threaded fasteners rotates said nuts and locks said nuts in said second plurality of axial bores and secures said engine flex plate to said transmission drive plate.

3. The engine transmission shaft connection of claim 1 wherein said engine output shaft includes a counterbore and said transmission input shaft includes an extension disposed in said counterbore.

4. The engine transmission shaft connection of claim 1 wherein said first plurality of axial bores are aligned with said second plurality of axial bores.

5. The engine transmission shaft connection of claim 1 wherein an axis of a threaded passageway in said nuts is offset from an axis of said eccentric flange.

* * * * *